United States Patent [19]

Yokoyama

[11] Patent Number: 5,138,671
[45] Date of Patent: Aug. 11, 1992

[54] IMAGE PROCESSING METHOD FOR DISTINGUISHING OBJECT BY DETERMINING THRESHOLD OF IMAGE LIGHTNESS VALUES

[75] Inventor: Haruhiko Yokoyama, Osaka, Japan

[73] Assignee: Matsushita Electric Industrial Co., Ltd., Osaka, Japan

[21] Appl. No.: 613,983

[22] Filed: Nov. 14, 1990

[30] Foreign Application Priority Data

Nov. 17, 1989 [JP] Japan ................... 1-300434

[51] Int. Cl.$^5$ .................. G06K 9/38; G06K 9/00
[52] U.S. Cl. ....................... 382/52; 382/51; 358/466
[58] Field of Search .............. 382/50, 51, 52, 53, 382/18; 358/464, 465, 466

[56] References Cited

U.S. PATENT DOCUMENTS

| | | | |
|---|---|---|---|
| 4,868,884 | 9/1989 | Miyezaki et al. | 382/30 |
| 4,998,122 | 3/1991 | Kanno et al. | 382/50 |

Primary Examiner—Michael Razavi
Assistant Examiner—Michael Cammarata
Attorney, Agent, or Firm—Wenderoth, Lind & Ponack

[57] ABSTRACT

An image processing method distinguishes an object from within an image area by determining a stable threshold value of light intensity values from within the image area. Received light is converted into image data denoting light intensity values of the received light at a plurality of points from within the image area. A bright portion average value denoting an average of the light intensity values which exceed a predetermined threshold and a dark portion average value denoting an average of the light intensity values which are less than the predetermined threshold are calculated. A new threshold is obtained by applying the bright portion average value and the dark portion average value to a predetermined dividing ratio. The object within the image area is distinguished using the new threshold. The method is also applicable to the use of multivalue thresholds.

8 Claims, 5 Drawing Sheets

IMAGE PROCESSING METHOD FOR DISTINGUISHING OBJECT BY DETERMINING THRESHOLD OF IMAGE LIGHTNESS VALUES

BACKGROUND OF THE INVENTION

The present invention relates to a method for determining the threshold of an image so as to automatically measure or inspect an industrial product utilizing image information.

In an image process for measuring the position of an object or inspecting the configuration thereof, it is necessary to separate a region corresponding to the object from the background thereof according to the image information. To this end, the following methods are carried out. First, a reference lightness (i.e. light intensity level) value, namely, a binarization threshold is determined. An image is divided into two portions depending on the lightness value thereof. That is, one portion (a bright portion) has a lightness value higher than the reference lightness value and the other portion (a dark portion) has a lightness value smaller than the reference lightness value. The bright portion and the dark portion are selected as the region of the object according to the reflectivities of the object and the background. According to this method, the lightness values of the image are converted into two values of zero and one, namely, the lightness values are binarized.

If a plurality of objects are to be measured or if the lightness value of the background is not uniform (i.e., if the background has a portion having a lightness value greater than that of the object and a portion having a lightness value smaller than that of the object), a plurality of reference lightness values are set to carry out, for example, ternarization of the lightness values of the image. The reference lightness value is called a multivalue threshold, for example, a ternarization threshold. It is necessary to determine the multivalue threshold, for example, the ternarization threshold, depending on an image condition which is varied by the fluctuations of illuminance and reflectivity of the object.

Two examples of conventional methods for determining a binarization threshold are described in detail below, while a method for determining a multivalue threshold is only briefly described (since the method for determining the multivalue threshold can be easily realized by expanding the method for determining the binarization threshold and has the same general characteristics as the method for determining the binarization threshold).

Figure 9:
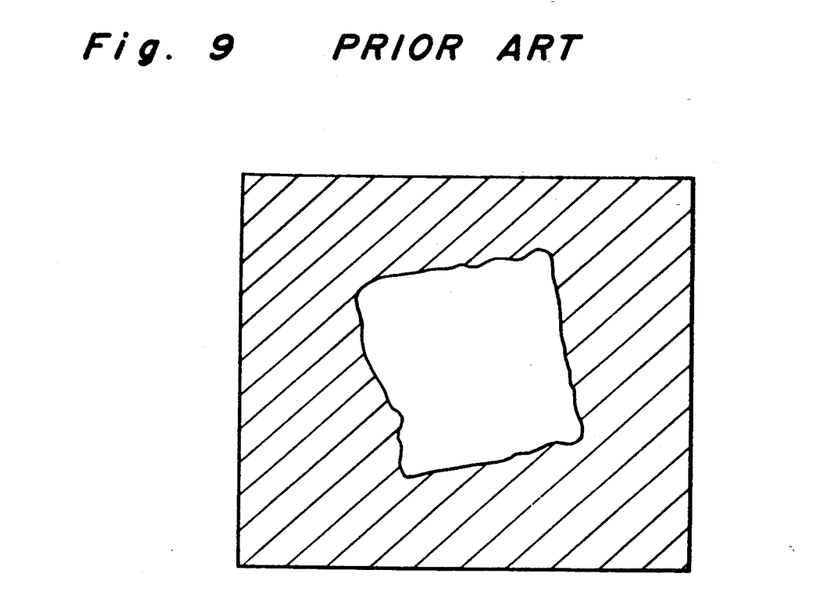
FIG. 9 is a schematic view showing an image obtained by binarizing the image shown in FIG. 7.

The first conventional method is described with reference to FIG. 6 and FIG. 9.

Figure 6:
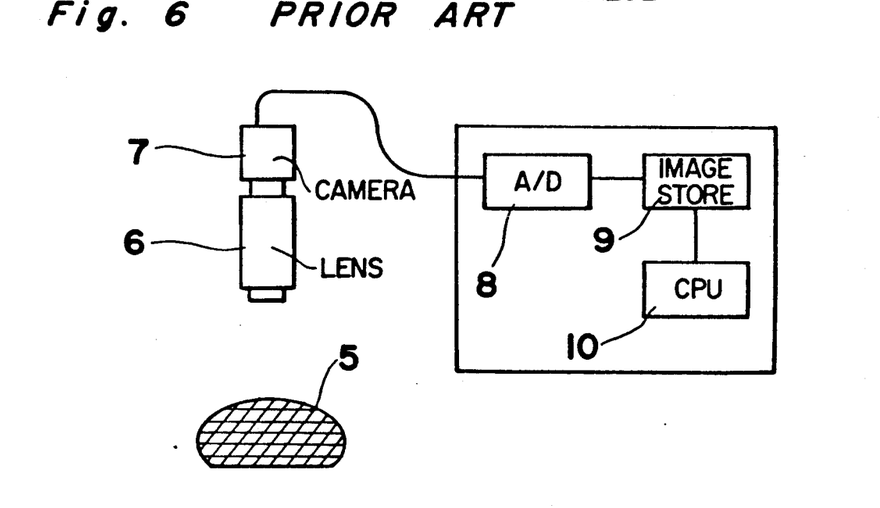
FIG. 6 is an illustration showing the entire structure of an image processing apparatus according to a first conventional method.

FIG. 6 is an illustration showing the entire structure of an image processing apparatus according to the first conventional method. The image of an object 5 is inputted to a television camera 7 through a lens 6. Upon receipt of a light image from the object 5, a photoelectric conversion circuit provided in the television camera 7 functions. An electric signal generated by the photoelectric conversion circuit is converted into digital value image data by an analog-digital conversion circuit 8. The image data is stored by an image storing circuit 9.

A central processing unit 10 processes the image data stored by the image storing circuit 9 as follows: A binarization threshold is determined so that the ratio of the area of a bright portion (having lightness values exceeding the binarization threshold) to the area of the entire image is equal to a preset binarization threshold determining ratio of the bright portion.

Figure 7:
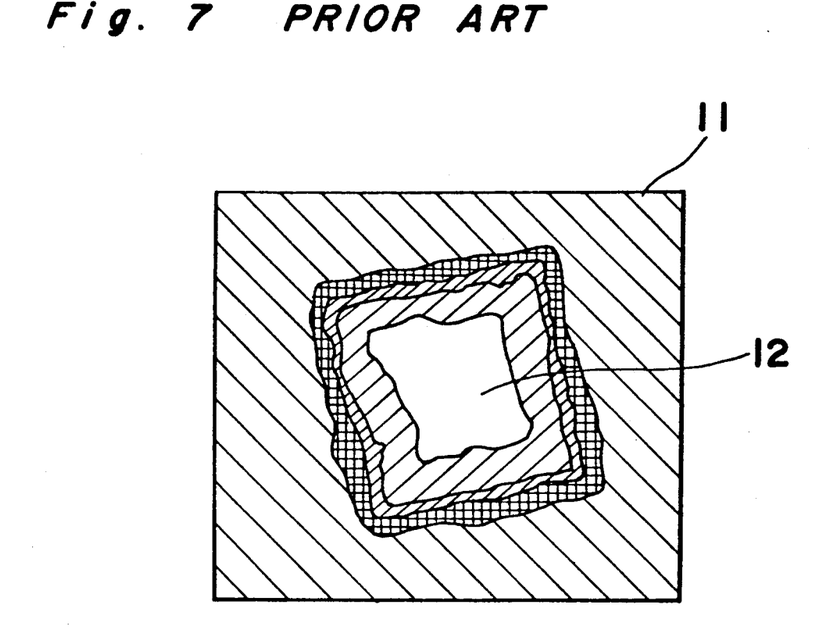
FIG. 7 is a schematic view showing the image of an object.

The binarization threshold determining ratio of the bright portion is normally determined as follows: First, a sample object having an acceptable reflectivity and configuration is selected. The sample object is hereinafter referred to as a reference object. FIG. 7 shows the image of a reference object 12 against a background 11. Binarization of the image lightness values of the image shown in FIG. 7 are repeatedly performed based on various binarization thresholds so as to determined by human judgement the most appropriate binarization threshold for measuring the position of the reference object 12 and inspecting the configuration thereof. Calculations are then performed to obtain the ratio of the area of a bright portion (having lightness values greater than the thus determined binarization threshold) to the area of the entire image. The above ratio is set as the binarization threshold determining ratio of the bright portion.

A characteristic of this method is that the binarization threshold varies greatly depending on the size of the reference object. The reason for this is described below.

Figure 8:
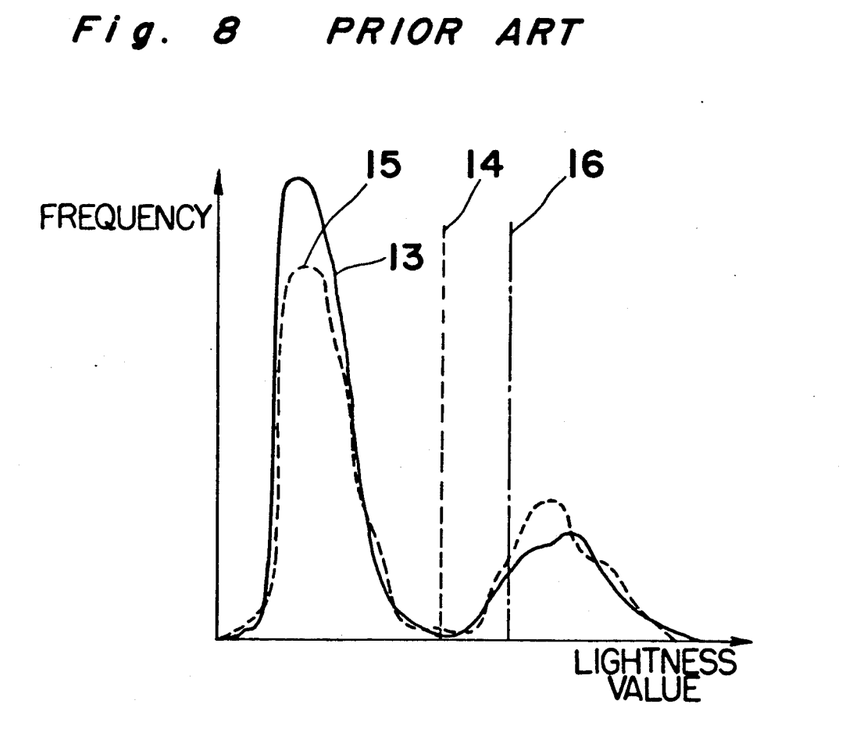
FIG. 8 is a lightness value histogram of an image.

FIG. 8 is a lightness histogram of an image. The abscissa axis denotes lightness values and the ordinate axis denotes a frequency of measured light values. The solid line 13 is the lightness histogram of the reference object 12 (the image shown in FIG. 7), and the dashed line 14 shows the level of the binarization threshold determined as most appropriate for measuring the position of the reference object 12 and inspecting the configuration thereof. The determination of a binarization threshold according to this method on an object other than the reference object 12 of FIG. 7 is described below. Suppose that the object is larger than the reference object 12. As shown by the lightness histogram 15 in FIG. 8, compared with the lightness histogram 13 of the reference object 12, the frequency of lightness values exceeding the threshold 14 increases. That is, the image of the object has a larger bright portion than that of the reference object 12. Consequently, the level of the binarization threshold of the image calculated based on the binarization threshold determining ratio of the bright portion increases as shown by the one-dot line 16 in FIG. 8, thus being greater than the binarization threshold 14 set as described above. Performing a binarization process based on this binarization threshold, the edge of the image looks unclear or thin as shown in FIG. 9. As such, the measurement of the position of an industrial product and the inspection of the configuration thereof cannot be appropriately carried out.

The situation described above occurs in the image processing of an object which is larger than the reference object. A similar situation occurs in the image processing of an object which is smaller than the reference object in which the configuration of the edge of the image also appears unclear or blurry. As with the larger object, the measurement of the position of a smaller object and the inspection of the configuration thereof cannot be appropriately carried out.

As is apparent from the above, according to the first conventional method, the appropriateness of the binarization threshold depends on the size of a measured object. That is, with an increase or decrease in the size of the object, the region or the edge corresponding to the object cannot be correctly processed in such a manner that the image of the object is distinguished from the background.

In order to expand the above method for determining the binarization threshold into a method for determining a multivalue threshold, two or more thresholds are repeatedly set according to respective multivalue threshold determining ratios of the bright portion. Such a method for determining the multivalue threshold has the same characteristics as discussed above with respect to the method for determining the binarization threshold.

Figure 10:
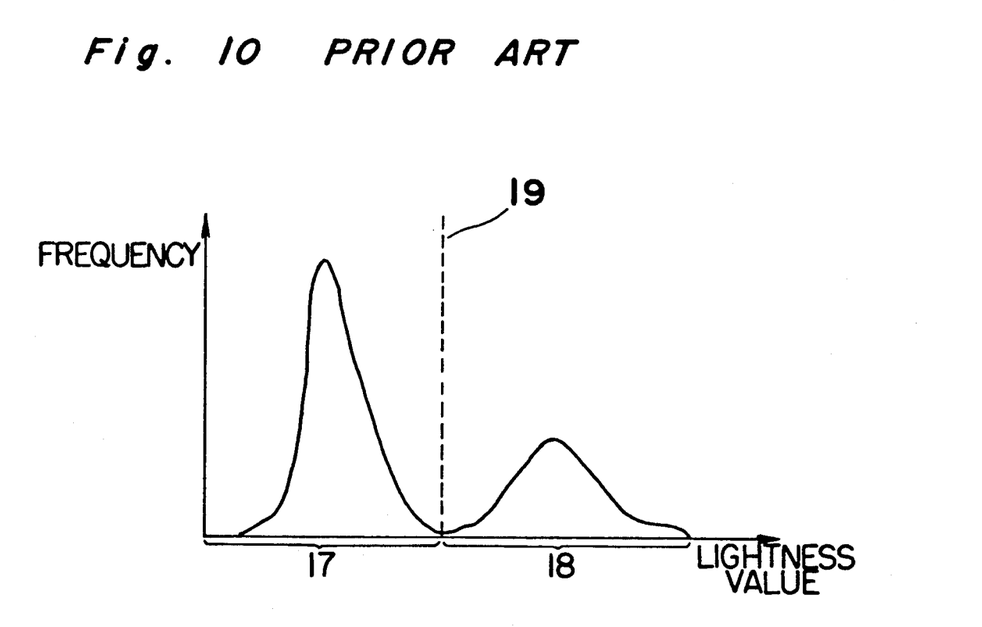
FIG. 10 is a lightness value histogram of an image according to a second conventional method.
Figure 11:
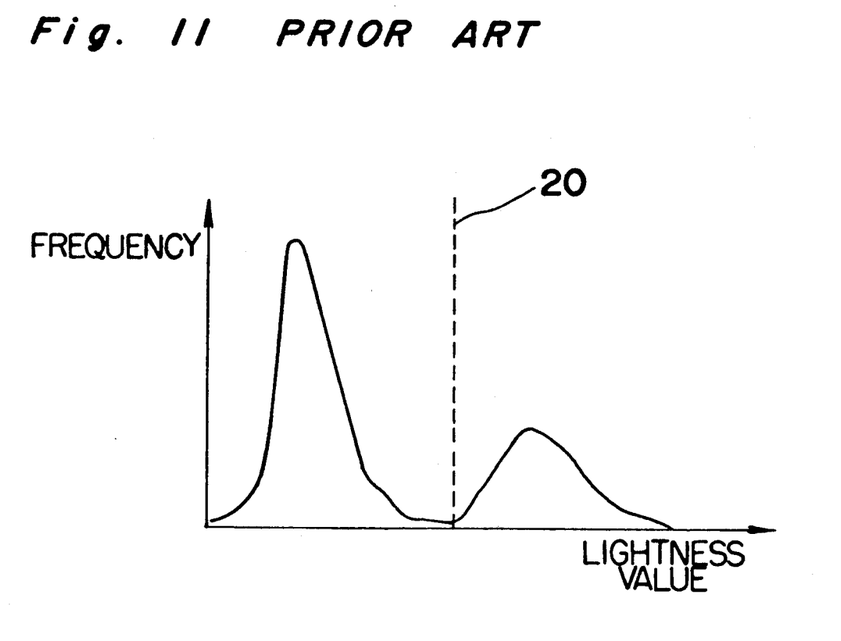
FIG. 11 is a lightness value histogram of an image.
Figure 12:
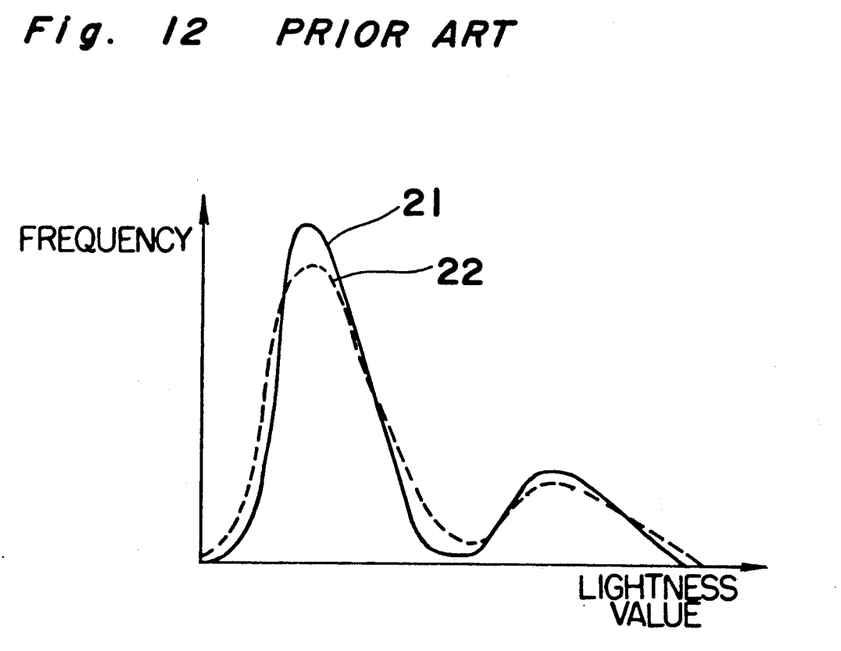
FIG. 12 is a histogram obtained by smoothing the histogram shown in FIG. 10.

Referring to FIG. 10 through FIG. 12, a second conventional method will be described below. The entire structure of an image processing apparatus according to the second conventional method is similar to that of the image processing apparatus according to the first conventional method shown in FIG. 6. The method for processing an image by the central processing unit according to the second conventional method is described below.

As shown in the lightness histogram of FIG. 10, a portion 17 corresponds to a background image and has a large frequency of lightness values which are smaller than a binarization threshold (which is described below), and a portion 18 corresponds to an object image and has a relatively small frequency of lightness values which are greater than the binarization threshold. A lightness value 19 at which the frequency lightness values is minimum between the two portions 17 and 18 is set as the binarization threshold.

A characteristic of the second conventional method is that there is a large fluctuation of the lightness values at the minimum frequency point. When the brightness of an object is significantly different from that of the background, the portion of the histogram at which the frequency is small fluctuates greatly in a wide range due to the fluctuation of an electric signal. That is, the lightness values of the image of an object in the minimum frequency point of the histogram fluctuate greatly in a wide range. The frequency of the lightness values becomes smallest at the lightness value 19 shown in the histogram of FIG. 10, while the frequency of lightness values becomes smallest at a lightness value represented by the dashed line 20 shown in the histogram of FIG. 11 in which the lightness distribution differs a little from that shown in FIG. 10. The lightness value 20 is much greater than the lightness value 19. In order to prevent the lightness values from fluctuating too much, the histogram may be smoothed, i.e., the histogram frequencies may be averaged in a certain range. However, depending on the object, the configuration of a smoothed histogram can differ significantly from that of the original histogram, and the lightness value at the minimum histogram frequency can thus become inappropriate for serving as a binarization threshold. For example, referring to FIG. 12, reference numeral 21 denotes a histogram of an image and reference numeral 22 designates a smoothed histogram obtained by smoothing the histogram 21. As shown, the configurations and the minimum values thereof clearly differ from each other.

As is apparent from the above description, according to the second conventional method, the calculated binarization threshold can be inappropriate due to influences, such as the fluctuations of electric signals, depending on the object measured. Therefore, the object or the edge of a region corresponding to the object cannot be appropriately distinguished from the background. No effective means to prevent this disadvantage has been found.

The determination of the binarization threshold according to the second conventional method may be expanded into a method for determining a multivalue threshold as follows: According to a method for determining the multivalue threshold, the lightness value distribution takes the form of three portions or more having valleys therebetween. Therefore, the minimum frequency point of each of the plurality of valleys is detected as a threshold. Such a method for determining the multivalue threshold has the same characteristics as those discussed above with respect to the method for determining the binarization threshold.

As described above, according to the conventional methods, depending on the object, an appropriate binarization threshold or multivalue thresholds cannot be obtained due to influences such as fluctuations of electric signals. Therefore, the object or the edge of a region corresponding to the object cannot be clearly distinguished from the background of the object.

SUMMARY OF THE INVENTION

Accordingly, an essential object of the present invention is to provide a method for determining the threshold of an image through which an appropriate binarization threshold or a multivalue threshold can be determined without the influence of factors other than the illuminance of an object or the reflectivity thereof.

In accomplishing these and other objects, according to one aspect of the present invention, there is provided a method for determining a lightness value threshold of an image, comprising the steps of: photoelectrically converting a light quantity reflected by an image of an object into an electric signal of an analog value; converting the electrical signal into image data of a digital value; calculating an average lightness value of each of a bright portion and a dark portion of the image, the bright portion and the dark portion obtained in accordance with a binarization threshold set in advance; and determining as a new binarization threshold a value obtained by dividing the average lightness value of the bright portion and the average lightness of the dark portion by a threshold dividing ratio set in advance.

According to another aspect of the present invention, there is provided a method for determining a lightness value threshold of an image, comprising the steps of: photoelectrically converting a light quantity reflected by an image of an object into an electric signal of an analog value; converting the electric signal into image data of a digital value; calculating an average lightness value of each of a plurality of portions ranging from a darkest portion to a brightest portion, the plurality of portions obtained in accordance with a plurality of multivalue thresholds previously set; and determining new multivalue thresholds values obtained by dividing each adjacent average lightness values obtained, by a respective threshold internal dividing ratio previously set, a number of which is equal to that of the multivalue thresholds.

According to the above methods of the present invention, image data is divided into a bright portion and a dark portion in accordance with a binarization threshold or a multivalue threshold set in advance, and the average lightness value of each of the bright portion and the dark portion is calculated. Then, a new binarization threshold or a new multivalue threshold is obtained by dividing the average lightness value of the bright portion and the average lightness value of the dark portion by a threshold dividing ratio set in advance.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Referring to the drawings, the method for determining the lightness value threshold of an image according to an embodiment of the present invention is described below.

The structure of an image processing apparatus to which the method according to the invention is applied is similar to that of the conventional method shown in FIG. 6 except for the function of the central processing unit thereof. Therefore, only the image processing to be executed by the central processing unit is described below. The first embodiment of the invention for determining a binarization threshold is described first. Then, a second embodiment according to the present invention for determining a multivalue threshold is described.

An initial binarization threshold is hereinafter referred to as the "old" binarization threshold and a binarization threshold calculated according to this embodiment is hereinafter referred to as a "new" binarization threshold.

An example of a method for determining the old binarization threshold is described first. Similar to the first conventional method, a reference object is selected, and binarization of image lightness values of the reference object is carried out to roughly determine based on human judgement an appropriate binarization threshold as the old binarization threshold.

After the old binarization threshold is thus determined, an image of an object to be measured is binarized. Calculations are performed to obtain the average of the lightness values of the image (a light portion) having values which are greater than the old binarization threshold lightness value, and the average of the lightness values of the image (a dark portion) having values which are smaller than the old binarization threshold lightness value. Each average thus obtained is denoted an average lightness value of a bright portion and an average lightness value of a dark portion.

The calculation of the new binarization threshold is performed through the following process:

Assume that the old binarization threshold is represented by tho; an internal dividing ratio of the threshold is indicated by r; and the image data is expressed as:

$$\{P_{ij} | 1 \leq i \leq N, 1 \leq j \leq M\},$$

wherein i and j are the abscissa and ordinate of the image, respectively, and N and M are sizes of the image.

The histogram of the images is expressed as follows:

A point of $h(l) = \{P_{ij} = l \text{ is the number of } (i, j)\}$. Therefore, the average lightness value $m_b$ of the bright portion and average lightness value $m_d$ of the dark portion are calculated by the following equations (1) and (2).

$$m_b = \frac{\sum_{l > tho} \{l \cdot h(l)\}}{\sum_{l > tho} h(l)} \quad (1)$$

$$m_d = \frac{\sum_{l > tho} \{l \cdot h(l)\}}{\sum_{l > tho} h(l)} \quad (2)$$

From $m_d$ and $m_b$, the new binarization threshold thn can be calculated as follows:

$$thn = r \cdot m_d + (1 - r) \cdot m_b$$

Figure 1:
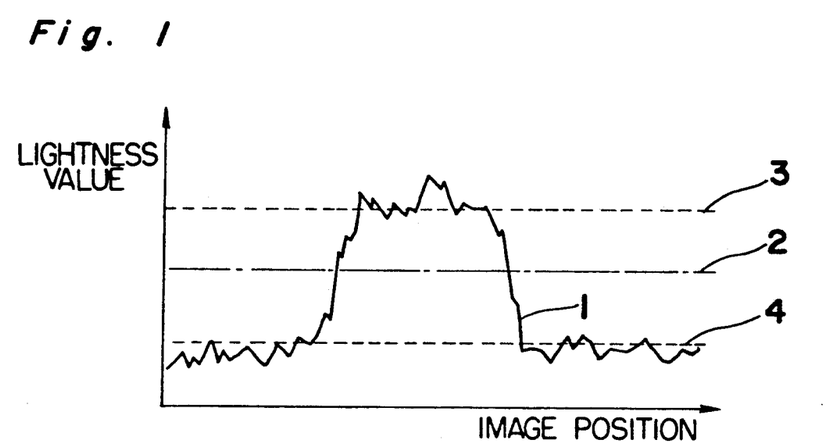
FIG. 1 is a histogram of an image used to describe a method for determining a threshold according to an embodiment of the present invention.
Figure 2:
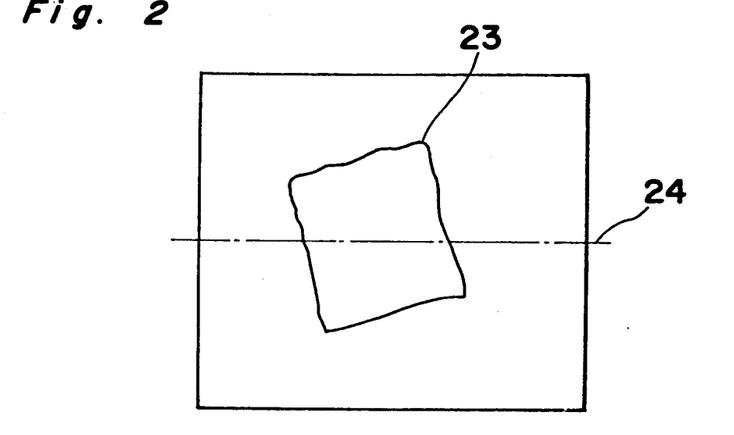
FIG. 2 is a schematic view showing the image of an object.

Compared with the conventional methods, a more stable binarization threshold can be obtained. According to the first conventional method, the threshold varies according to the area of an object, whereas according to the first embodiment, the threshold is not affected by a change in the area of an object. FIG. 2 shows an image of an object 23 against a dark background. In FIG. 1, reference numeral 1 denotes a graph of the lightness values of the image of FIG. 2 along a line 24, reference numeral 3 denotes the average lightness value of the portion of the image having lightness values which are greater than the old binarization threshold 2, and reference numeral 4 denotes the average lightness value of the portion of the image having lightness values which are smaller than the old binarization threshold 2. The average lightness values 3 and 4 is not influenced by the size of the object 23 but are instead determined according to the brightness of the object and the background.

According to the second conventional method, the fluctuation of lightness values is great at the minimum frequency point of the histogram, and thus the threshold thereof is not stable, while according to the first embodiment, the threshold is not influenced by the fluctuation of the lightness values at the minimum frequency point. That is, the fluctuation of the lightness values at the minimum frequency point is caused by fluctuations of electric signals. According to the first embodiment, the lightness values are averaged to eliminate such factors which influence the threshold.

The old binarization threshold is used to calculate the new threshold according to the first embodiment. The fluctuation of the new binarization threshold is made smaller than that of the old binarization threshold by selecting the old binarization threshold at a valley point of the histogram. Particularly, in processing a sharp image, the fluctuation of the new binarization threshold becomes very small. The reason for this is described below.

Figure 3:
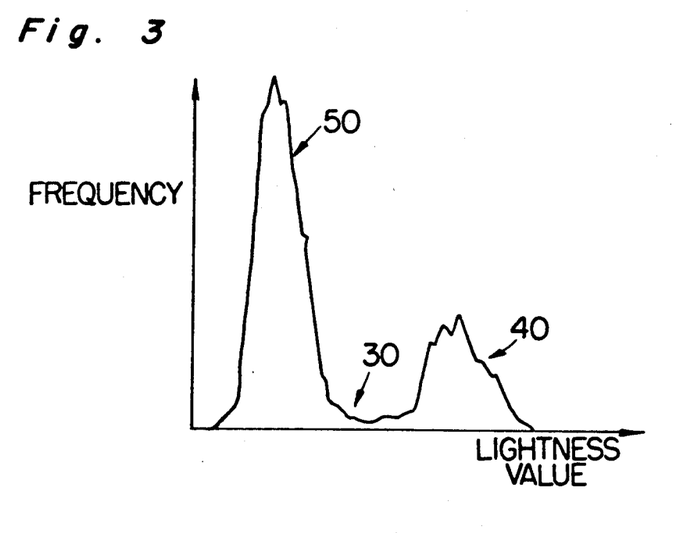
FIG. 3 is the lightness value histogram of the image shown in FIG. 2.

The histogram of a sharp image as shown in FIG. 1 has a low valley portion as shown in FIG. 3. The valley portion does not contribute much in calculating of an averaged lightness value. Therefore, the average lightness value of each of the bright portion and the dark portion is not greatly changed even though the old binarization threshold is changed at the valley portion.

This can be demonstrated by equations as shown below.

Calculations are performed to obtain a fluctuation $\Delta m_d$ of the average lightness value $m_d$ of the dark portion resulting when the old binarization threshold fluctuates by $\Delta t$.

$$m_d = \frac{\sum_{l=0}^{tho} \{l \cdot h(l)\}}{\sum_{l=0}^{tho} h(l)} \tag{3}$$

$$m_d + \Delta m_d = \frac{\sum_{l=0}^{tho+\Delta t} \{l \cdot h(l)\}}{\sum_{l=0}^{tho+\Delta t} h(l)} \tag{4}$$

Equation (1) is abbreviated as h. Equation (5) is obtained by the difference between equations (3) and (4).

$$\Delta m_d = \frac{\sum_{l=0}^{tho+\Delta t}(l \cdot h) \cdot \sum_{l=0}^{tho} h - \sum_{l=0}^{tho} h(l \cdot h) \cdot \sum_{l=0}^{tho+\Delta t} h}{\sum_{l=0}^{tho+\Delta t} h \cdot \sum_{l=0}^{tho} h} \tag{5}$$

Changing equation (5), equation (6) is obtained.

$$\Delta m_d = \frac{\sum_{l=tho+1}^{tho+\Delta t}(l \cdot h) \cdot \sum_{l=0}^{tho} h - \sum_{l=0}^{tho}(l \cdot h) \cdot \sum_{l=tho+1}^{tho+\Delta t} h}{\sum_{l=0}^{tho+\Delta t} h \cdot \sum_{l=0}^{tho} h} \tag{6}$$

From equation (6), equation (7) is obtained as follows:

$$\Delta m_d \leq \frac{\sum_{l=tho+1}^{tho+\Delta t}(l \cdot h)}{\sum_{l=0}^{tho+\Delta t} h} \tag{7}$$

In following equation (8), $\bar{h}$ is the average frequency in the interval $[tho+1, tho+\Delta t]$ and $\bar{H}$ is the average frequency in the interval $[0, tho+\Delta t]$.

That is, $$\sum_{l=tho+1}^{tho+\Delta t} = \bar{h} \cdot \Delta t \tag{8}$$

$$\sum_{l=0}^{tho+\Delta t} = \bar{H} \cdot (tho + \Delta t) \tag{9}$$

From equation (8), the following equation (10) is obtained:

$$\sum_{l=tho+1}^{tho+\Delta t}(l \cdot h) \leq \sum_{l=tho+1}^{tho+\Delta t}\{(tho + \Delta t) \cdot h\} = (tho + \Delta t) \cdot \bar{h} \cdot \Delta t \tag{10}$$

Substituting equations (9) and (10) for equation (7), $$\Delta m_d \leq \frac{\bar{h} \cdot \Delta t}{\bar{H}} \tag{11}$$

Since the old binarization threshold is selected at the valley of the histogram, $$\bar{h} < \bar{H} \ldots \tag{12}$$

That is, $$\Delta m_d < \Delta t \ldots \tag{13}$$

In the case of a sharp image, $$\bar{h} << \bar{H} \ldots \tag{14}$$

That is, $$\Delta m_d << \Delta t \ldots \tag{15}$$

As is understood from the above equation (15), the fluctuation amount of the average lightness value of the dark portion is smaller than that of the old binarization threshold and much smaller than that of the sharp image threshold.

In consideration of the symmetrical properties of lightness and darkness, the relationship between the fluctuation of the average lightness value of the bright portion and that of the old binarization threshold is similar to the above. Accordingly, the above relationship holds for the new binarization threshold obtained by dividing each average lightness value of the dark portion and the bright portion by a threshold dividing ratio. Supposing that a threshold dividing ratio is 0.5, the new binarization threshold is set to a value intermediate between the lightness level of the background and that of the object. Instead of increasing or decreasing a binarization threshold in order to cope with the irregular reflection of the background and the lightness fluctuation of the object, the threshold dividing ratio is set to a greater or smaller value according to the invention.

Figure 4:
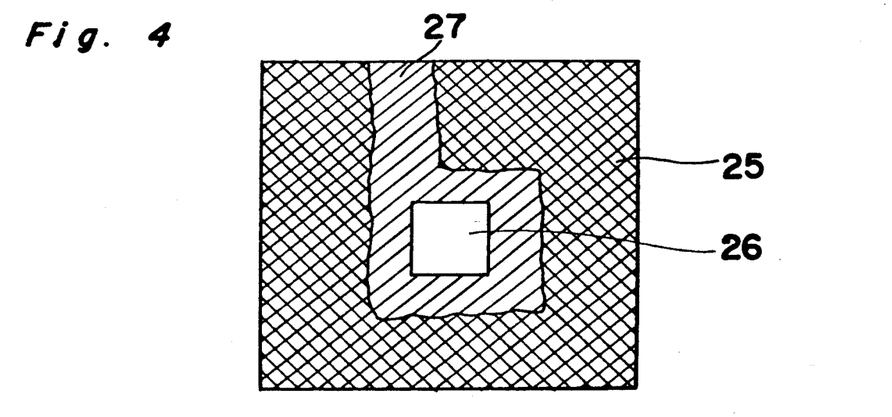
FIG. 4 is a schematic view showing an image for describing a method for determining a multivalue threshold according to an embodiment of the present invention.
Figure 5:
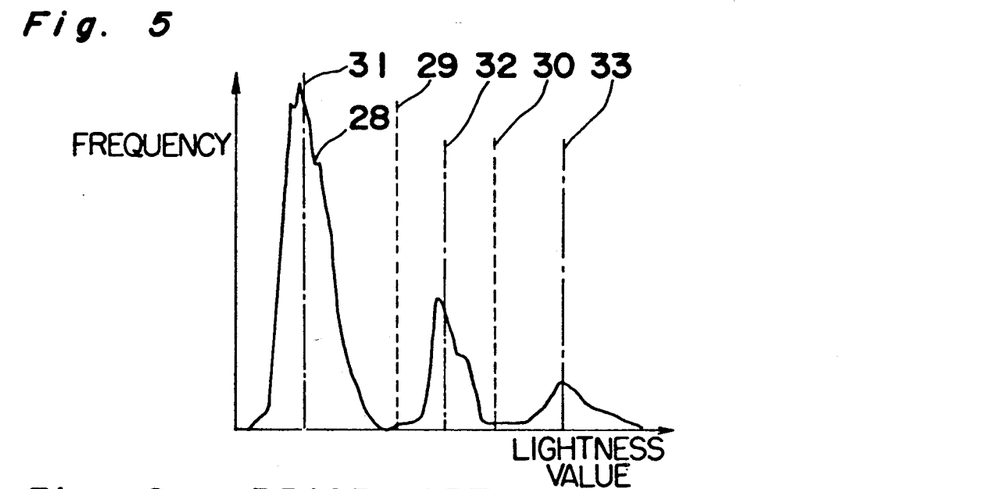
FIG. 5 is the lightness value histogram of the image shown in FIG. 4.

Referring to FIGS. 4 and 5, the method for determining a multivalue threshold according a second embodiment of the present invention is described below.

Similar to the first embodiment, an initial multivalue threshold referred to as an "old" multivalue threshold which is set is advance, and a multivalue threshold calculated according to the second embodiment is referred to as a "new" multivalue threshold.

First, a ternarization process is described below. Referring to FIG. 4, an object is positioned in a dark background 25. The object is divided into a bright portion 26, the dark background 25, and an intermediate portion 27 having a lightness level intermediate between the lightness level of the background 25 and that of the bright portion 26. The solid line 28 of FIG. 5 indicates the lightness value histogram of FIG. 4. As shown, the lightness distribution converges at three portions in this case.

Two old multivalue thresholds $tho_1$ and $tho_2$ ($tho_1 < tho_2$) are each set to a certain value, denoted by reference numerals 29 and 30 of FIG. 5, at the two valleys portions shown. The image of the object is divided into three portions, namely, a first portion having lightness values smaller than the threshold value 29; a second portion having lightness values intermediate between the threshold values lines 29 and 30; and a third portion having lightness values greater than the threshold value 30. The average lightness value $m_1$, $m_2$, and $m_3$ is calculated for each portion and are shown by reference numerals 31, 32, and 33 in FIG. 5. Under this condition, two new multivalue thresholds $thn_1$ and $thn_2$ are calculated using threshold dividing ratios $r_1$ and $r_2$ based on equations (16) and (17).

$$thn_1 = r_1 \cdot m_1 + (1-r_1) \cdot m_2 \qquad (16)$$

$$thn_2 = r_2 \cdot m_2 + (1-r_2) \cdot m_3 \qquad (17)$$

Generally, the following is established when the lightness level of the image is converted into N portions ($N \geq 3$):

(N-1) old multivalue thresholds are expressed as follows:

$$\{tho_i | 1 \leq i \leq N-1, tho_i < tho_{i+1}\}$$

Based on the above, the image is divided into N portions, namely, a portion having lightness values smaller than $tho_i$, a portion having lightness values intermediate between $tho_i$ and $tho_{i+1}$, and a portion having lightness values greater than $tho_{N-1}$. The average lightness values $\{m_i | 1 \leq i \leq N\}$ are calculated in each portion.

(N - 1) threshold dividing ratios are defined as follows:

$$\{r_i | 1 \leq i \leq N-1\}$$

Using equation (18) shown below, (N−1) new multivalue thresholds $\{thn_i | 1 \leq i \leq N-1\}$ are calculated.

$$thn_i = r_i \cdot m_i + (1-r_i) \cdot m_{i+1} \qquad (18)$$

Similar to the binarization threshold of the first embodiment, the multivalue threshold of the second embodiment is not affected by the fluctuation of the size of an object or other factors such as the fluctuation of electric signals.

As described above, according to the present invention, a binarization threshold and a multivalue threshold can be determined without the influence of factors other than the illuminance of an object or the reflectivity thereof.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

I claim:
1. An image processing method comprising:
receiving light reflected from an image area, the image area including an object therein;
converting the thus received light into image data denoting light intensity values of the received light at a plurality of points within the image area;
calculating a bright portion average value denoting an average of the light intensity values which exceed a predetermined threshold and a dark portion average value denoting an average of the light intensity values which are less than the predetermined threshold;
determining a new threshold by applying the bright portion average value and the dark portion average value to a predetermined dividing ratio; and,
converting the image data by applying said new threshold to distinguish the object from within the image area.

2. A method as recited in claim 1, wherein said converting step includes converting the received light into analog signals, and converting the analog signals into digital signals denoting the image data.

3. A method as recited in claim 1, wherein, in said determining step, $thn = r \cdot m_d + (1-r) \cdot m_b$, wherein thn denotes the new threshold, $m_d$ and $m_b$ respectively denote the dark portion and bright portion average values, and r denotes the predetermined dividing ratio.

4. A method as recited in claim 2, wherein, in said determining step, $thn = r \cdot m_d + (1-r) \cdot m_b$, wherein thn denotes the new threshold, $m_d$ and $m_b$ respectively denote the dark portion and bright portion average values, and r denotes the predetermined dividing ratio.

5. An image processing method comprising:
receiving light reflected from an image area, the image area including an object therein;
converting the thus received light into image data denoting light intensity values of the received light at a plurality of points within the image area;
setting in advance (N−1) predetermined thresholds, N being an integer of three or more, wherein an nth predetermined threshold is less than an (n+1)th predetermined threshold, wherein n = 1 ... (N−1);
calculating N average light intensity values respectively denoting an average of the light intensity values which fall within N ranges defined by the (N−1) predetermined thresholds;
determining (N−1) new thresholds by applying each pair of average light intensity values of adjacent ranges to a respective predetermined dividing ratio; and,
converting the image data by applying said (N−1) new thresholds to distinguish the object from within the image area.

6. A method as recited in claim 5, wherein said converting step includes converting the received light into analog signals, and converting the analog signals into digital signals denoting the image data.

7. A method as recited in claim 5, wherein, in said determined step, $thn_n = r_n \cdot m_a + (1-r_n) m_b$, wherein $thn_n$ denotes an nth new threshold, $m_a$ and $m_b$ respectively denote average light intensity values of adjacent ranges, and $r_n$ denotes a corresponding nth respective dividing ratio.

8. A method as recited in claim 6, wherein, in said determined step, $thn_n = r_n \cdot m_a + (1-r_n) m_b$, wherein $thn_n$ denotes an nth new threshold, $m_a$ and $m_b$ respectively denote average light intensity values of adjacent ranges, and $r_n$ denotes a corresponding nth respective dividing ratio.

* * * * *